US008402817B2

(12) United States Patent
Mellone et al.

(10) Patent No.: US 8,402,817 B2
(45) Date of Patent: Mar. 26, 2013

(54) METHOD AND APPARATUS FOR MONITORING FOR LEAKS IN A STAGE II FUEL VAPOR RECOVERY SYSTEM

(75) Inventors: Joseph A. Mellone, Gorham, ME (US); Randall S. Boucher, Saco, ME (US)

(73) Assignee: Franklin Fueling Systems, Inc., Madison, WI (US)

( * ) Notice: Subject to any disclaimer, the term of this patent is extended or adjusted under 35 U.S.C. 154(b) by 477 days.

(21) Appl. No.: 12/473,595

(22) Filed: May 28, 2009

(65) Prior Publication Data

US 2009/0293592 A1 Dec. 3, 2009

Related U.S. Application Data

(60) Provisional application No. 61/056,528, filed on May 28, 2008.

(51) Int. Cl.
*G01M 3/04* (2006.01)
(52) U.S. Cl. ............... 73/40.7; 73/49.2; 141/45
(58) Field of Classification Search .......... 73/40 R–49.8
See application file for complete search history.

(56) References Cited

U.S. PATENT DOCUMENTS

| | | | |
|---|---|---|---|
| 3,350,704 A | 10/1967 | Kessler | |
| 3,735,634 A | 5/1973 | Clinton et al. | |
| 3,745,338 A | 7/1973 | Joyce | |
| 3,800,586 A | 4/1974 | Delatorre et al. | |
| 4,131,216 A | 12/1978 | Gerstenmaier et al. | |
| 4,147,096 A | 4/1979 | Caswell | |
| 4,166,485 A | 9/1979 | Wokas | |
| 4,215,565 A | 8/1980 | Zanker | |
| 4,247,899 A | 1/1981 | Schiller et al. | |
| 4,320,653 A | 3/1982 | Bernhardt | |
| 4,410,109 A | 10/1983 | Murrell, Jr. et al. | |
| 4,442,702 A | 4/1984 | Sawada | |
| 4,462,249 A | 7/1984 | Adams | |
| 4,508,127 A | 4/1985 | Thurston | |
| 4,523,454 A | 6/1985 | Sharp | |
| 4,534,208 A | 8/1985 | Macin et al. | |
| 4,543,819 A | 10/1985 | Chin et al. | |
| 4,566,504 A | 1/1986 | Furrow et al. | |
| 4,568,925 A | 2/1986 | Butts | |
| 4,570,686 A | 2/1986 | Devine | |
| 4,611,729 A | 9/1986 | Gerstenmaier et al. | |
| 4,653,334 A | 3/1987 | Capone | |
| 4,670,847 A | 6/1987 | Furuse | |
| 4,680,004 A | 7/1987 | Hirt | |

(Continued)

FOREIGN PATENT DOCUMENTS

DE 10 2005 048 348 4/2007

OTHER PUBLICATIONS

State of California, California Environmental Protection Agency, Air Resources Board, Final Statement of Reasons for Rulemaking, Including Summary of Comments and Agency Response, Public Hearing to Consider the Adoption, Amendment and Repeal of Regulations Regarding Certification Procedures and Test Procedures for Gasoline Vapor Recovery Systems, Public Hearing Dates: Mar. 23, 2000, Agenda Item No. 00-3-2 (211 pp.).

(Continued)

*Primary Examiner* — Hezron E. Williams
*Assistant Examiner* — Hoang Nguyen
(74) *Attorney, Agent, or Firm* — Faegre Baker Daniels LLP

(57) ABSTRACT

A system and method for detecting a leak in a Stage II vapor recovery system is disclosed. The system may monitor the Stage II vapor recovery system for the occurrence of quiet times and record pressure data during those quiet times. The system may make a determination of a leak based on the evaluation of the pressure data from a plurality of the quiet times.

45 Claims, 4 Drawing Sheets

U.S. PATENT DOCUMENTS

| | | |
|---|---|---|
| 4,687,033 A | 8/1987 | Furrow et al. |
| 4,749,009 A | 6/1988 | Faeth |
| 4,827,987 A | 5/1989 | Faeth |
| 4,835,522 A | 5/1989 | Andrejasich et al. |
| 4,835,717 A | 5/1989 | Michel et al. |
| 4,842,027 A | 6/1989 | Faeth |
| 4,862,734 A | 9/1989 | Elderton |
| 4,871,450 A | 10/1989 | Goodrich et al. |
| 4,876,530 A | 10/1989 | Hill |
| 4,914,943 A | 4/1990 | Lagergren |
| 4,938,251 A | 7/1990 | Furrow et al. |
| 4,967,809 A | 11/1990 | Faeth |
| 4,978,029 A | 12/1990 | Furrow et al. |
| 4,986,445 A | 1/1991 | Young et al. |
| 5,013,434 A | 5/1991 | Furrow |
| 5,014,543 A | 5/1991 | Franklin et al. |
| 5,027,499 A | 7/1991 | Prohaska |
| 5,038,838 A | 8/1991 | Bergamini et al. |
| 5,040,077 A | 8/1991 | Hamano |
| 5,040,576 A | 8/1991 | Faeth |
| 5,040,577 A | 8/1991 | Pope |
| 5,065,350 A | 11/1991 | Fedder |
| 5,090,234 A | 2/1992 | Maresca, Jr. et al. |
| 5,116,759 A | 5/1992 | Klainer et al. |
| 5,129,433 A | 7/1992 | Faeth |
| 5,131,262 A | 7/1992 | Wood et al. |
| 5,143,258 A | 9/1992 | Mittermaier |
| 5,151,111 A | 9/1992 | Tees et al. |
| 5,156,199 A | 10/1992 | Hartsell, Jr. et al. |
| 5,165,379 A | 11/1992 | Thompson |
| 5,195,564 A | 3/1993 | Spalding |
| 5,203,384 A | 4/1993 | Hansen |
| 5,216,914 A | 6/1993 | Horner |
| 5,220,822 A | 6/1993 | Tuma |
| 5,240,045 A | 8/1993 | Faeth |
| 5,244,022 A | 9/1993 | Gimby |
| 5,267,470 A | 12/1993 | Cook |
| 5,269,353 A | 12/1993 | Nanaji et al. |
| 5,280,814 A | 1/1994 | Stroh |
| 5,295,391 A | 3/1994 | Mastandrea et al. |
| 5,317,899 A | 6/1994 | Hutchinson et al. |
| 5,319,956 A | 6/1994 | Bogle et al. |
| 5,323,817 A | 6/1994 | Spalding |
| 5,325,312 A | 6/1994 | Kidd |
| 5,325,896 A | 7/1994 | Koch et al. |
| 5,327,776 A | 7/1994 | Yasui et al. |
| 5,332,008 A | 7/1994 | Todd et al. |
| 5,332,011 A | 7/1994 | Spalding |
| 5,333,654 A | 8/1994 | Faeth |
| 5,333,655 A | 8/1994 | Bergamini et al. |
| 5,355,915 A | 10/1994 | Payne |
| 5,365,985 A | 11/1994 | Todd et al. |
| 5,369,984 A | 12/1994 | Rogers et al. |
| 5,375,455 A | 12/1994 | Maresca, Jr. et al. |
| 5,386,812 A | 2/1995 | Curran et al. |
| 5,408,866 A | 4/1995 | Kawamura et al. |
| 5,417,256 A | 5/1995 | Hartsell, Jr. et al. |
| 5,423,457 A | 6/1995 | Nicholas et al. |
| 5,448,980 A | 9/1995 | Kawamura et al. |
| 5,450,883 A | 9/1995 | Payne et al. |
| 5,452,621 A | 9/1995 | Aylesworth et al. |
| 5,460,054 A | 10/1995 | Tran |
| 5,461,906 A | 10/1995 | Bogle et al. |
| 5,464,466 A | 11/1995 | Nanaji et al. |
| 5,500,369 A | 3/1996 | Kiplinger |
| 5,507,325 A | 4/1996 | Finlayson |
| RE35,238 E | 5/1996 | Pope |
| 5,526,679 A | 6/1996 | Filippi |
| 5,542,458 A | 8/1996 | Payne et al. |
| 5,563,339 A | 10/1996 | Compton et al. |
| 5,563,341 A | 10/1996 | Fenner et al. |
| 5,568,828 A | 10/1996 | Harris |
| 5,571,310 A | 11/1996 | Nanaji |
| 5,590,697 A | 1/1997 | Benjey et al. |
| 5,592,979 A | 1/1997 | Payne et al. |
| 5,625,156 A | 4/1997 | Serrels et al. |
| 5,626,649 A | 5/1997 | Nanaji |
| 5,650,943 A | 7/1997 | Powell et al. |
| 5,663,492 A | 9/1997 | Alapati et al. |
| 5,668,308 A | 9/1997 | Denby |
| 5,671,785 A | 9/1997 | Andersson |
| 5,689,061 A | 11/1997 | Seitler et al. |
| 5,720,325 A | 2/1998 | Grantham |
| 5,731,514 A | 3/1998 | Miwa et al. |
| 5,752,411 A | 5/1998 | Harpster |
| 5,755,854 A | 5/1998 | Nanaji |
| 5,757,664 A | 5/1998 | Rogers et al. |
| 5,765,121 A | 6/1998 | Schwager et al. |
| 5,779,097 A | 7/1998 | Olson et al. |
| 5,780,245 A | 7/1998 | Maroteaux |
| 5,782,275 A | 7/1998 | Hartsell, Jr. et al. |
| 5,794,667 A | 8/1998 | Payne et al. |
| 5,803,136 A | 9/1998 | Hartsell, Jr. |
| 5,832,967 A | 11/1998 | Andersson |
| 5,843,212 A | 12/1998 | Nanaji |
| 5,850,857 A | 12/1998 | Simpson |
| 5,857,500 A | 1/1999 | Payne et al. |
| 5,860,457 A | 1/1999 | Andersson |
| 5,868,175 A | 2/1999 | Duff et al. |
| 5,878,790 A | 3/1999 | Janssen |
| 5,889,202 A | 3/1999 | Alapati et al. |
| 5,890,474 A | 4/1999 | Schnaibel |
| 5,898,108 A | 4/1999 | Mieczkowski et al. |
| 5,911,248 A | 6/1999 | Keller |
| 5,913,343 A | 6/1999 | Andersson |
| 5,915,270 A | 6/1999 | Lehmann |
| 5,942,980 A | 8/1999 | Hoben et al. |
| 5,944,067 A | 8/1999 | Andersson |
| 5,956,259 A | 9/1999 | Hartsell, Jr. et al. |
| 5,964,812 A | 10/1999 | Schumacher et al. |
| 5,985,002 A | 11/1999 | Grantham |
| 5,988,232 A | 11/1999 | Koch et al. |
| 5,992,395 A | 11/1999 | Hartsell, Jr. et al. |
| 6,026,866 A | 2/2000 | Nanaji |
| 6,037,184 A | 3/2000 | Matilainen et al. |
| 6,038,922 A | 3/2000 | Mauze et al. |
| 6,047,745 A | 4/2000 | Fournier |
| 6,065,507 A | 5/2000 | Nanaji |
| 6,070,453 A | 6/2000 | Myers |
| 6,082,415 A | 7/2000 | Rowland et al. |
| 6,102,085 A | 8/2000 | Nanaji |
| 6,103,532 A | 8/2000 | Koch et al. |
| 6,123,118 A | 9/2000 | Nanaji |
| 6,131,621 A | 10/2000 | Garrard |
| 6,151,955 A | 11/2000 | Ostrowski et al. |
| 6,167,747 B1 | 1/2001 | Koch et al. |
| 6,167,923 B1 | 1/2001 | Hartsell |
| 6,169,938 B1 | 1/2001 | Hartsell |
| 6,170,539 B1 | 1/2001 | Pope et al. |
| 6,223,789 B1 | 5/2001 | Koch et al. |
| 6,244,310 B1 | 6/2001 | Rowland et al. |
| 6,247,508 B1 | 6/2001 | Negley, III et al. |
| 6,289,721 B1 | 9/2001 | Blumenstock |
| 6,302,165 B1 | 10/2001 | Nanaji et al. |
| 6,305,440 B1 | 10/2001 | McCall et al. |
| 6,308,119 B1 | 10/2001 | Majkowski et al. |
| 6,311,548 B1 | 11/2001 | Breidenbach et al. |
| 6,325,112 B1 | 12/2001 | Nanaji |
| 6,336,479 B1 | 1/2002 | Nanaji |
| 6,338,369 B1 | 1/2002 | Shermer et al. |
| 6,347,649 B1 | 2/2002 | Pope et al. |
| 6,357,493 B1 | 3/2002 | Shermer et al. |
| D457,084 S | 5/2002 | Pope |
| 6,386,246 B2 | 5/2002 | Pope et al. |
| 6,418,981 B1 | 7/2002 | Nitecki et al. |
| 6,578,408 B1 | 6/2003 | Denby |
| 6,622,757 B2 | 9/2003 | Hart et al. |
| 6,802,344 B2 | 10/2004 | Hart |
| 6,802,345 B1 | 10/2004 | Hart et al. |
| 6,880,585 B2 | 4/2005 | Hart et al. |
| 6,901,786 B2 | 6/2005 | Hart |
| 6,964,283 B2 | 11/2005 | Hart |
| 6,968,868 B2 | 11/2005 | Hart et al. |
| 7,275,417 B2 | 10/2007 | Hart |
| 8,191,585 B2 | 6/2012 | Mellone et al. |
| 2004/0231404 A1 | 11/2004 | Yamaguchi et al. |
| 2005/0081612 A1 | 4/2005 | Hosoya et al. |

| | | |
|---|---|---|
| 2005/0107964 A1 | 5/2005 | Wakairo |
| 2005/0125138 A1 | 6/2005 | Hosoya et al. |
| 2005/0257780 A1 | 11/2005 | Suzuki |
| 2005/0262932 A1 | 12/2005 | Hayashi et al. |
| 2006/0052931 A1 | 3/2006 | Shikama et al. |
| 2006/0053868 A1 | 3/2006 | Chung et al. |
| 2006/0130568 A1 | 6/2006 | Ishii et al. |
| 2007/0079650 A1 | 4/2007 | Streib et al. |
| 2008/0216916 A1 | 9/2008 | Hart |

OTHER PUBLICATIONS

Wolf Koch, CARB Needs to Modify Plan for Improving Vapor Recovery Program, Viewpoint: More Time, Better Data Needed, Petroleum Equipment & Technology Magazine (Aug. 1999) (8 pp.).
Wolf Koch, Is CARB Playing Favorites? Unbalanced Treatment of Assist Vapor Recovery Systems, Petroleum Equipment & Technology Magazine (Nov. 1999) (3 pp.).
Ted Tiberi, Recognizing the Total Vapor Picture, Petroleum Equipment & Technology Magazine (Aug. 2000)(6 pp.).
Glen Walker, Separating the Good Air From the Bad, Petroleum Equipment & Technology Magazine (Aug. 2000) (6 pp.).
Robert Bradt, The Latest Word on Thermal Oxidizers, Petroleum Equipment & Technology Magazine (Sep. 2000) (7 pp.).
Koch and Simpson, An Evaluation of CARB's Performance Tests, Petroleum Equipment & Technology Magazine (Oct. 1999) (9 pp.).
Robert Bradt, Retooling the Vapor Recovery System, Petroleum Equipment & Technology Magazine (Aug. 2000) (3 pp.).
Draft Performance Standards for In-Station Diagnostics (to be incorporated into CP-201), California Air Resources Board (Aug. 1999) (1p.).
Robert Bradt, Retooling the Vapor Recovery System, Petroleum Equipment & Technology Magazine (Jul. 2000) (6 pp.).
California Environmental Protection Agency, Air Resources Board, Vapor Recovery Certification Procedure, CP-201, Certification Procedure for Vapor Recovery Systems at Gasoline Dispensing Facilities (Feb. 2001) (46 pp.).
California Environmental Protection Agency, Air Resources Board, Vapor Recovery Test Procedure, TP-201.5, Air to Liquid Volume Ratio (Feb. 2001) (14 pp.).
California Air Resources Board, Title 17, Notice of Public Hearing to Consider Amendments to the Vapor Recovery Certification and Test Procedure Regulations for Enhanced Vapor Recovery (Mar. 2000) (11 pp.).
California Environmental Protection Agency, Air Resources Board, Hearing Notice and Staff Report Enhanced Vapor Recovery Initial Statement of Reasons for Proposed Amendments to the Vapor Recovery Certification and Test Procedures for Gasoline Loading an dMotor Vehicle Gasoline Refueling at Service Stations (Feb. 2000) (140 pp.).
California Air Resources Board, Vapor Recovery Test Methods, Existing Procedures (Apr. 2000) (3 pp.).
California Air Resources Board, Vapor Recovery Test Methods, Existing Procedures (Mar. 2001) (5 pp.).
Can Escaping Vapors be Recaptured With New Technology? Petroleum Equipment & Technology Magazine (Apr. 1999) (6 pp.).
California Air Resources Board, Vapor Recovery Certification Procedure, CP-201 (Apr. 1996) (39 pp.).
California Air Resources Board, Vapor Recovery Certification Procedure, CP-201.2 (Apr. 1996) (71 pp.).
California Air Resources Board, Vapor Recovery Certification Procedure, CP-201.3 (Apr. 1996) (28 pp.).
Veeder-Root Company, ORVR Compatiblity and Vapor Recovery Monitoring (Sep. 2004) (2 pp.).
Dennis Weber, et al., Passive Vapor Monitoring of Underground Storage Tanks for Leak Detection (May 1989) (18 pp.).
International Preliminary Report on Patentability dated Aug. 31, 2010 in corresponding PCT application No. PCT/US2009/045424.
International Search Report dated Nov. 26, 2009 in corresponding PCT application No. PCT/US2009/045424.
Extended Search Report dated May 11, 2012 in corresponding European Application No. 12 00 1788.
California Environmental Protection Agency, Air Resources Board, Vapor Recovery Test Procedure TP-201.3, Adoptedd: Apr. 12, 1996, Amended: Mar. 17, 1999.
California Environmental Protection Agency, Air Resources Board, Vapor Recovery Definitions, D-200, Adopted: Apr. 12, 1996, last Amended: Jul. 3, 2002.
California Environmental Protection Agency, Air Resources Board, Vapor Recovery Certification Procedure, CP-201, Adopted: Dec. 9, 1975, last Amended: May 25, 2006.
Franklin Fueling Systems, Fuel Management Systems, catalog, Dec. 2007.

METHOD AND APPARATUS FOR MONITORING FOR LEAKS IN A STAGE II FUEL VAPOR RECOVERY SYSTEM

RELATED APPLICATIONS

This application claims the benefit of U.S. Provisional Patent Application Ser. No. 61/056,528, filed May 28, 2008, the entire disclosure of which is expressly incorporated by reference herein.

This application is related to U.S. Provisional Patent Application Ser. No. 61/056,522, filed May 28, 2008, the entire disclosure of which is expressly incorporated by reference herein.

TECHNICAL FIELD

This invention relates to a method and apparatus for detecting vapor leaks in a Stage II vapor recovery system.

BACKGROUND OF INVENTION

Historically as fuel was being dispensed into a vehicle's fuel tank, typically from an underground storage tank (UST), vapor in the vehicle's fuel tank would escape into the atmosphere. In order to prevent this, Stage II vapor recovery systems were developed to collect this vapor and return it to the UST.

Stage II vapor recovery systems recover fuel vapor released from a vehicle's fuel tank as fuel is being dispensed into the vehicle's fuel tank. As is known, Stage II vapor recovery systems may be a balance type system or a vacuum-assist type system. Stage II vapor recovery systems typically are only installed in urban areas where the escaping fuel vapors can pose a greater threat to the environment.

It is desirable to detect whether there is a leak in the vapor recovery system. However current procedures typically require one to first pressurize the system to a predetermined pressure.

SUMMARY

In an exemplary embodiment of the present disclosure, a system for detecting a leak in a stage II fuel vapor recovery system is provided. In another exemplary embodiment of the present disclosure, a method for detecting a leak in a stage II fuel vapor recovery system is provided. In an exemplary embodiment of the present disclosure, a computer readable medium is provided including instructions which when executed by a controller are used to detect a leak in a stage II fuel vapor recovery system.

In another exemplary embodiment of the present disclosure, a system which monitors for leaks in a vapor recovery system of a fuel dispensing system including an underground storage tank and a plurality of dispensing points in fluid communication with the underground storage tank is provided. The system comprising: a controller which continuously monitors the vapor recovery system for leaks by monitoring the vapor recovery system for a quiet time period wherein there is the absence of external changes to vapor recovery system; recording pressure data during the quiet time period; and based on the recorded pressure data determining whether the vapor recovery system contains a leak. In one example, the determination of whether the vapor recovery system contains a leak is based on the recorded pressure data from a plurality of spaced apart quiet time periods. In one variation thereof, the controller classifies each of the plurality of spaced apart quiet time periods as one of positive and negative and the controller determines that the vapor recovery system contains the leak when a percentage of negative quiet time periods exceeds a threshold value. In one refinement thereof, the threshold value is 66 percent. In another refinement thereof, the controller classifies a given quiet time period as positive based on a starting pressure of the quiet time period and an ending pressure of the quiet time period when the starting pressure and the ending pressure are both negative and the ending pressure is more negative than the starting pressure. In still another refinement thereof, the controller classifies a given quiet time period as positive based on a starting pressure of the quiet time period and an ending pressure of the quiet time period when the starting pressure is negative and the ending pressure is positive. In yet another refinement thereof, the controller classifies a given quiet time period as positive based on a starting pressure of the quiet time period and an ending pressure of the quiet time period when the starting pressure is zero and the ending pressure is positive. In yet still another refinement thereof, the controller classifies a given quiet time period as positive based on a starting pressure of the quiet time period and an ending pressure of the quiet time period when the starting pressure is zero and the ending pressure is negative. In a further refinement thereof, the controller classifies a given quiet time period as negative based on a starting pressure of the quiet time period and an ending pressure of the quiet time period when the starting pressure is zero and the ending pressure is zero. In still a further refinement thereof, the controller classifies a given quiet time period as positive based on a starting pressure of the quiet time period and an ending pressure of the quiet time period when the starting pressure is positive and the ending pressure is negative. In yet a further refinement thereof, the controller classifies a given quiet time period as positive based on a starting pressure of the quiet time period and an ending pressure of the quiet time period when the starting pressure and the ending pressure are both positive and the ending pressure is more positive than the starting pressure. In another variation, the controller classifies a given quiet time period as one of positive and negative based on a degree of linearity of the recorded pressure data of the given quiet time period. In a refinement thereof, the degree of linearity is an $R^2$ value, the given quiet time period is classified as one of positive and negative when the $R^2$ value is below a threshold amount. In another refinement thereof, the threshold amount is 0.90. In still another refinement thereof, the controller classifies a given quiet time period as positive based on the recorded pressure data when a starting pressure of the quiet time period and an ending pressure of the quiet time period are both negative, the ending pressure is less negative than the starting pressure, and the $R^2$ value of the pressure data is below the threshold amount. In yet still another refinement thereof, the controller classifies a given quiet time period as negative based on the recorded pressure data when a starting pressure of the quiet time period is negative, an ending pressure of the quiet time period is zero, and the $R^2$ value of the pressure data is below the threshold amount. In still a further refinement thereof, the controller classifies a given quiet time period as negative based on the recorded pressure data when a starting pressure of the quiet time period is positive, an ending pressure of the quiet time period is zero, and the $R^2$ value of the pressure data is below the threshold amount. In yet another refinement thereof, the controller classifies a given quiet time period as positive based on the recorded pressure data when a starting pressure of the quiet time period and an ending pressure of the quiet time period are both positive, the ending pressure is less positive than the starting pressure, and the $R^2$ value of the pressure data is below the threshold amount. In still another variation, the controller classifies a given quiet time period as one of positive and negative based on a pressure decay slope of an ullage of the vapor recovery system without pressurization of the vapor recovery system. In a refinement thereof, based on a number of dispensing points, a starting pressure of the ullage, and a volume of the ullage a threshold slope is determined. In another refinement thereof, when the pressure decay slope is less than the threshold slope the given quiet time period is classified as positive. In another example, the controller first attempts to classify a given quiet time period as one of positive and negative based on the starting pressure and the ending pressure, if inconclusive then further on a degree of linearity of the pressure data, and, if still inconclusive, then further on a pressure decay slope of an ullage of the vapor recovery system, without the need to pressurize the vapor recovery system or to limit fuel dispensing from the fuel dispensing system. In still another example, monitoring the vapor recovery system for a quiet time period includes monitoring whether any dispensing points are active and monitoring whether fuel is being delivered to the underground storage tank, wherein if either a dispensing point is active or fuel is being delivered to the underground storage tank a quiet time period does not exist. in yet still another example, monitoring the vapor recovery system for a quiet time period includes monitoring whether any dispensing points are active, whether a vapor processor of the vapor recovery system is active, and monitoring whether fuel is being delivered to the underground storage tank, wherein if either a dispensing point is active, the vapor processor is active, or fuel is being delivered to the underground storage tank a quiet time period does not exist. In still a further example, a given quiet time period is at least twelve minutes. In a variation thereof, the given quiet time period is up to sixty minutes.

In still another exemplary embodiment of the present disclosure, a method for monitoring a vapor recovery system of a fuel dispensing system including an underground storage tank and a plurality of dispensing points in fluid communication with the underground storage tank for a leak is provided. The method comprising the steps of continuously monitoring the vapor recovery system for a quiet time period wherein there is the absence of external changes to vapor recovery system; recording pressure data during the quiet time period; and based on the recorded pressure data determining whether the vapor recovery system contains a leak.

In a further exemplary embodiment of the present disclosure, a system which monitors for leaks in a vapor recovery system of a fuel dispensing system including an underground storage tank and a plurality of dispensing points in fluid communication with the underground storage tank is provided. The system comprising: a controller which monitors the vapor recovery system for leaks by monitoring the vapor recovery system for a quiet time period wherein there is the absence of external changes to vapor recovery system; recording pressure data during the quiet time period; and based on the recorded pressure data determining whether the vapor recovery system contains a leak without pressurizing the vapor recovery system.

In yet still another exemplary embodiment of the present disclosure, a method for monitoring a vapor recovery system of a fuel dispensing system including an underground storage tank and a plurality of dispensing points in fluid communication with the underground storage tank for a leak is provided. The method comprising the steps of monitoring the vapor recovery system for a quiet time period wherein there is the absence of external changes to vapor recovery system; recording pressure data during the quiet time period; and based on the recorded pressure data determining whether the vapor recovery system contains a leak without pressurizing the vapor recovery system.

BRIEF DESCRIPTION OF THE DRAWING

The above-mentioned and other features and advantages of this invention, and the manner of attaining them, will become more apparent and the invention itself will be better understood by reference to the following description of an embodiment of the invention taken in conjunction with the accompanying drawings, wherein.

DETAILED DESCRIPTION OF THE PREFERRED EMBODIMENT

Figure 1:
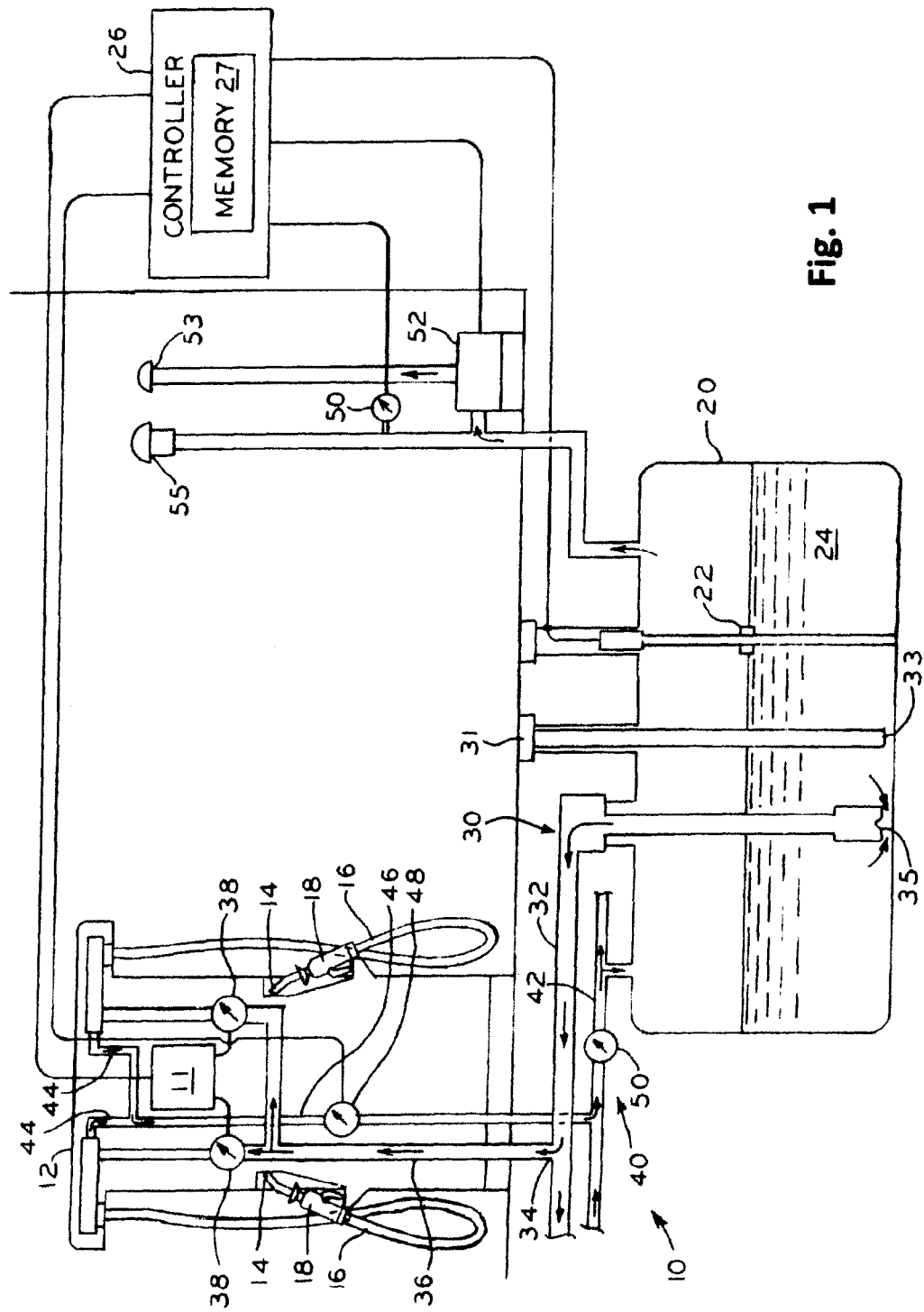
FIG. 1 is a block diagram of a fuel dispensing system in accordance with the present invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

A fuel dispensing system 10, such as one for use at a conventional retail gasoline station, is illustrated in FIG. 1. The fuel dispensing system 10 typically includes multiple fuel dispensers 12 (only one illustrated), each having two dispensing points 14 (i.e., two assemblies, each comprising a conventional hose 16 and a nozzle 18), for dispensing fuel from a UST 20. UST 20 is filled with fuel through a fuel pipe 31 which introduces the fuel into a lower portion of UST 20 through pipe end 33. The UST 20 includes a conventional fuel level sensor 22 to measure the level of fuel 24 in the UST 20. Electrical signals from the fuel level sensor 22 are communicated to a microprocessor based controller 26, such as Franklin Electric Co., Inc.'s TS-5 automatic tank gauge, which runs software in a conventional manner. This permits the controller 26 to monitor the level of fuel 24 in the UST 20, and thus inversely to monitor the ullage volume of the UST 20. This also permits the controller 26 to monitor when fuel 24 is being delivered to the UST 20. In one embodiment, controller 26 is located within a central location, such as a station house.

In one embodiment, the ullage volume is the common vapor space volume of a plurality of USTs. In this embodiment, respective USTs deliver respective octane levels of gasoline to dispensing points based on a selection by the user at the dispenser. The vapor recovery system returns vapors to the USTs through piping which is coupled to each of the USTs; thereby providing a common vapor ullage space for the USTs. This results in a single ullage pressure across all USTs. In one embodiment, each UST has an independent ullage volume and thus the vapor recovery system must analyze each ullage volume independently. This results in potentially different ullage pressures in the different USTs.

The fuel dispensing system 10 also includes a fuel delivery system 30 for transferring fuel 24 from the UST 20 to each of the dispensing points 14. The fuel delivery system 30 typically includes a fuel supply line 32 to provide a common conduit for fuel delivery from the UST 20 to a branch fuel line 34 associated with a respective one of each of the dispensers 12. A pump 35 is provided in UST 20 to pump fuel through a fuel supply line 32 to dispensers 12. Each of the branch fuel lines 34 then splits into two fuel delivery lines 36 to provide fuel to each of the dispensing points 14 of a particular one of the dispensers 12. Each of the fuel delivery lines 36 includes a fuel flow sensor 38. Each of the fuel flow sensors 38 generates an electrical signal indicative of the quantity of fuel flowing through the sensor 38, and thus dispensed into a vehicle (not shown). In one embodiment, sensors 38 are volume meters. The signals from the fuel flow sensors 38 are also communicated to the controller 26.

Each dispenser 12 provides signals to the controller 26 indicating whether either one of the dispensing points 14 is in a hook-off condition (i.e., when the dispensing points 14 is not authorized to dispense fuel, and is therefore "idle") or whether the dispensing points 14 is in a hook-on condition (i.e., when the dispensing points 14 is authorized to dispense fuel, and is therefore "active"). In one embodiment, each dispenser 12 includes pump electronics 11 which monitor the condition (active or idle) of each of the dispensing points 14, sensors 38 and 48, and the customer display outputs of the dispenser 12.

The fuel dispensing system also includes a Stage II vapor recovery system 40. The vapor recovery system 40 may be either a balance type system or a vacuum-assist type system.

Similar to the fuel delivery system 30, the vapor recovery system 40 includes a common vapor return line 42 to provide a common vapor return conduit to return fuel vapor from each of the dispensing points 14 to the UST 20. Each of the dispensing points 14 has an associated dispensing point vapor return line 44. The two dispensing point vapor return lines 44 for each of the dispensing points 14 associated with a respective one of the dispensers 12 connect to a dispenser vapor return line 46. Each of the dispenser vapor return lines 46 connects with the common vapor return line 42.

A vapor return flow sensor 48 is placed in-line with each of the dispenser vapor return lines 46 (i.e., a single return flow sensor is associated with each of the dispensers). The return flow sensors 48 generate electrical signals indicative of the magnitude of vapor return flow through their associated dispenser vapor line 46 towards the UST 20. In one embodiment, sensors 38 are volume meters. These electrical signals from the return flow sensors 48 are also electrically transmitted to the controller 26.

The vapor recovery system 40 also includes a pressure sensor 50 to measure the vapor pressure in the vapor recovery system 40. Pressure sensor 50 monitors the pressure of the ullage. In one embodiment, pressure sensor 50 is provided in line 42. In one embodiment, pressure sensor 50 is located on a vent pipe connected with pressure/vacuum valve 55. In either location, pressure sensor 50 is coupled to controller 26. The vapor pressure sensor 50 generates an electrical signal, indicative of the vapor pressure of the ullage, which is communicated to the controller 26.

The vapor recovery system 40 may include a conventional vapor processor 52, particularly if the vapor recovery system 40 is a balance type vapor recovery system, to prevent build-up of excessive pressure in the fuel dispensing system 10. Vapor processor 52 may process vapors to convert them to liquid. Vapor processor 52 may burn the vapors and vent the resultant products thereof to atmosphere through vent pipe 53. The operation of vapor processor 52 affects the pressure of the ullage in storage tank 20. Vapor processor 52 is an active system. In contrast to vapor processor 52, vapor recovery system 40 may instead include a clean air separator (CAS). The CAS includes an internal bladder which may either reduce or increase the volume of the ullage. The CAS is a passive system. In one embodiment, the bladder does not expand until a positive pressure is present in the ullage volume. For the system described herein, negative pressure is all pressures up to and including −0.1" wc, zero pressure is all pressures between −0.1" wc and 0.1" wc, and positive pressure is all pressures above and including 0.1" wc. The bladder of the CAS system does not move to expand the ullage volume until the ullage pressure is at least 0.1" wc. Likewise, the bladder of the CAS system does not move to reduce the ullage volume until the ullage pressure is −0.1" wc and below. A pressure/vacuum relief valve 55 is provided to prevent the ullage pressure from becoming too high or too low. Electrical signals from the vapor processor 52 are communicated to the controller 26, so that the controller 26 can monitor when the vapor processor 52 is active. Further, electrical signals from the vapor processor 52 are communicated to the controller 26, so that the controller 26 may monitor when the vapor processor 52 is in an alarm condition indicating that the vapor processor 52 is not functioning correctly. In one embodiment, when vapor processor 52 is in an alarm condition all dispensing points 14 are shut down for the fuel dispensing system 10.

The present system 10 includes an in-station diagnostic system (ISD) wherein the controller 26 conducts a pressure test to monitor pressure in the vapor recovery system 40 to detect fuel vapor leaks. In one embodiment, the pressure test is based on a plurality of pressure test evaluations, each made during a quiet time.

A "quiet time" is a period of time when there are no external changes to the vapor recovery system 40, as such changes would affect the pressure in the system 40. These external changes occur at times such as when fuel is being dispensed, when fuel is being delivered to the UST 20, and when the vapor processor 52 is active.

The controller 26 continuously monitors the system 10 to determine the presence or absence of a quiet time. A minimum quiet time of twelve minutes is required to complete a pressure quiet period evaluation, the first two minutes to permit the system to stabilize and a subsequent minimum ten minute period to conduct the evaluation procedure.

During the evaluation procedure, pressure samples are taken once per minute and stored in conventional memory 27 of the controller 26. In order to monitor the presence or absence of a quiet time, the controller 26 utilizes a "quiet sample" register located in conventional memory 27 of the controller 26. The controller 26 sets the "quiet sample" register to "true" when all of the dispensing points 14 are in a hook-off condition (i.e., idle), when no fuel is being delivered to the UST 20 and when the vapor processor 52 is inactive, (i.e., when all three conditions are satisfied). Similarly the controller 26 sets the quiet sample register to "false" when any of the dispensing points 14 are in a hook-on condition (i.e., active), when fuel is being delivered to the UST 20 or when the vapor processor 52 is active, (i.e., when any one of the three conditions are satisfied).

If the controller 26 determines that a quiet time has ended prior to completion of the minimum twelve minute test period, the pressure evaluation is terminated and the pressure data is cleared from memory 27. Otherwise, the controller 26 continues collecting data for the pressure evaluation for a maximum of sixty minutes.

Figure 2:
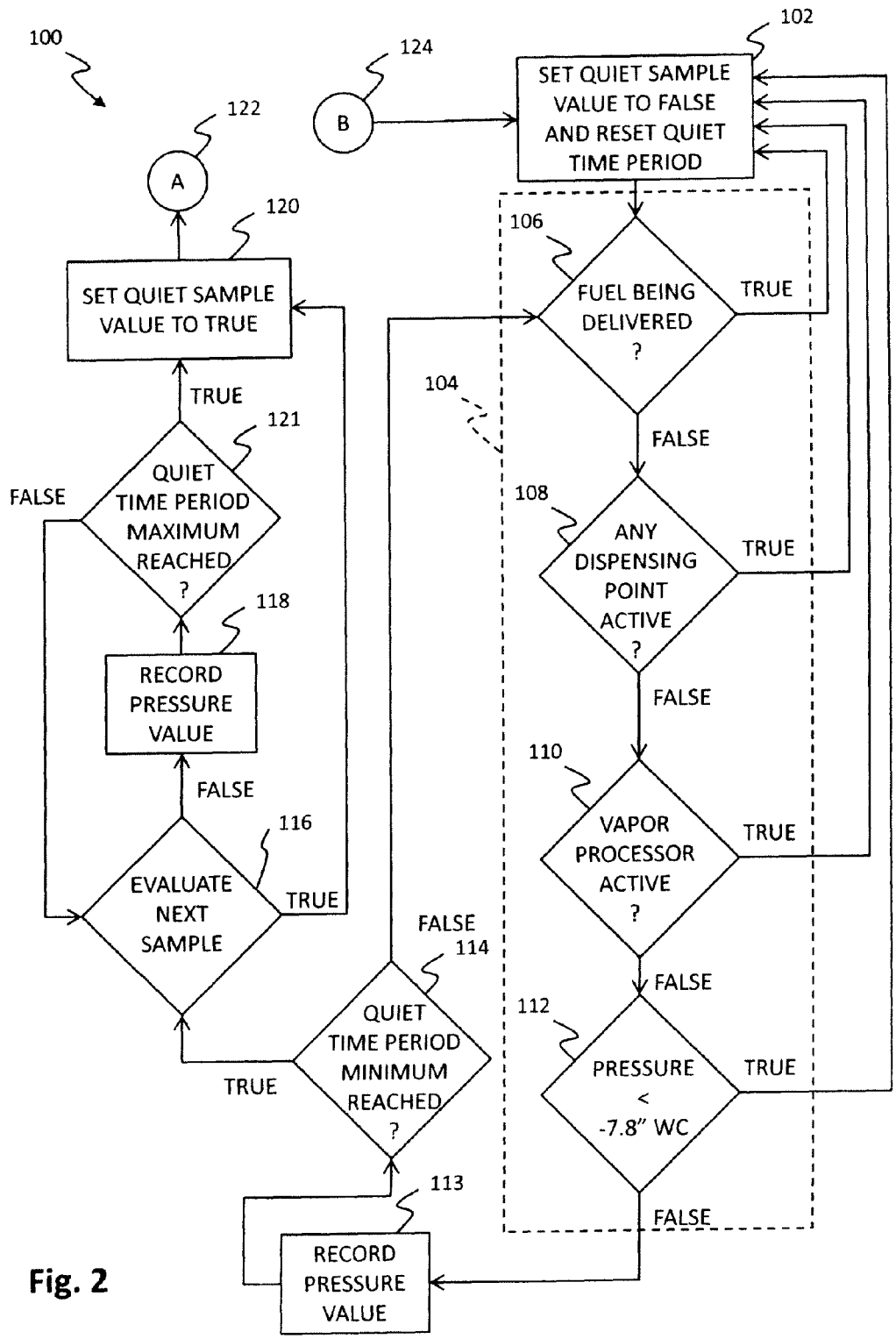
FIGS. 2-4 represent processing sequences of a controller of the fuel dispensing system.

Specifically the controller 26 continuously executes a first software sub-routine 100 (see FIG. 2) to determine the presence or absence of a quiet time. The quiet sample value is set to false and the quiet time period is reset, as represented by block 102. Controller 26 executes a series of checks, collectively represented by block 104. The controller 26 first determines if the ullage has decreased by forty liters, to determine whether fuel is being delivered to the UST 20 (as represented by block 106). The controller 26 then determines if any of the dispensers 12 are in a hook-on condition (as represented by block 108). The controller 26 then determines if the vapor processor 52 is active (as represented by block 110). The controller 26 then determines if the pressure is less than (i.e., more negative than) −7.8" wc (as represented by block 112). If any of these determinations are true, the controller 26 sets the quiet register sample value to false and the quiet time period is reset. The controller 26 also determines whether the evaluation period has met the quiet time period minimum, for example twelve minutes (as represented by block 114). If the minimum time period has been met, controller 26 evaluates the next sample (as represented by block 116) for the conditions represented in block 104. Pressure values are recorded (as represented by block 118) until a quiet time maximum value is reached (as represented by block 120). The quiet sample value is set to true (as represented by block 122) and controller 26 begins an evaluation of the recorded pressure data which is represented by block 122. Once the evaluation is completed, controller 26 returns to block 124 and monitors for a subsequent quiet time.

The controller 26 also executes a second sub-routine which monitors the status of the quiet register. If the controller 26 determines that the quiet register is false, the quiet time evaluation is terminated and started again. The controller 26 continues to monitor the quiet register and begins a quiet time pressure evaluation as soon as the status of the quiet register is determined to be true.

Figure 3:
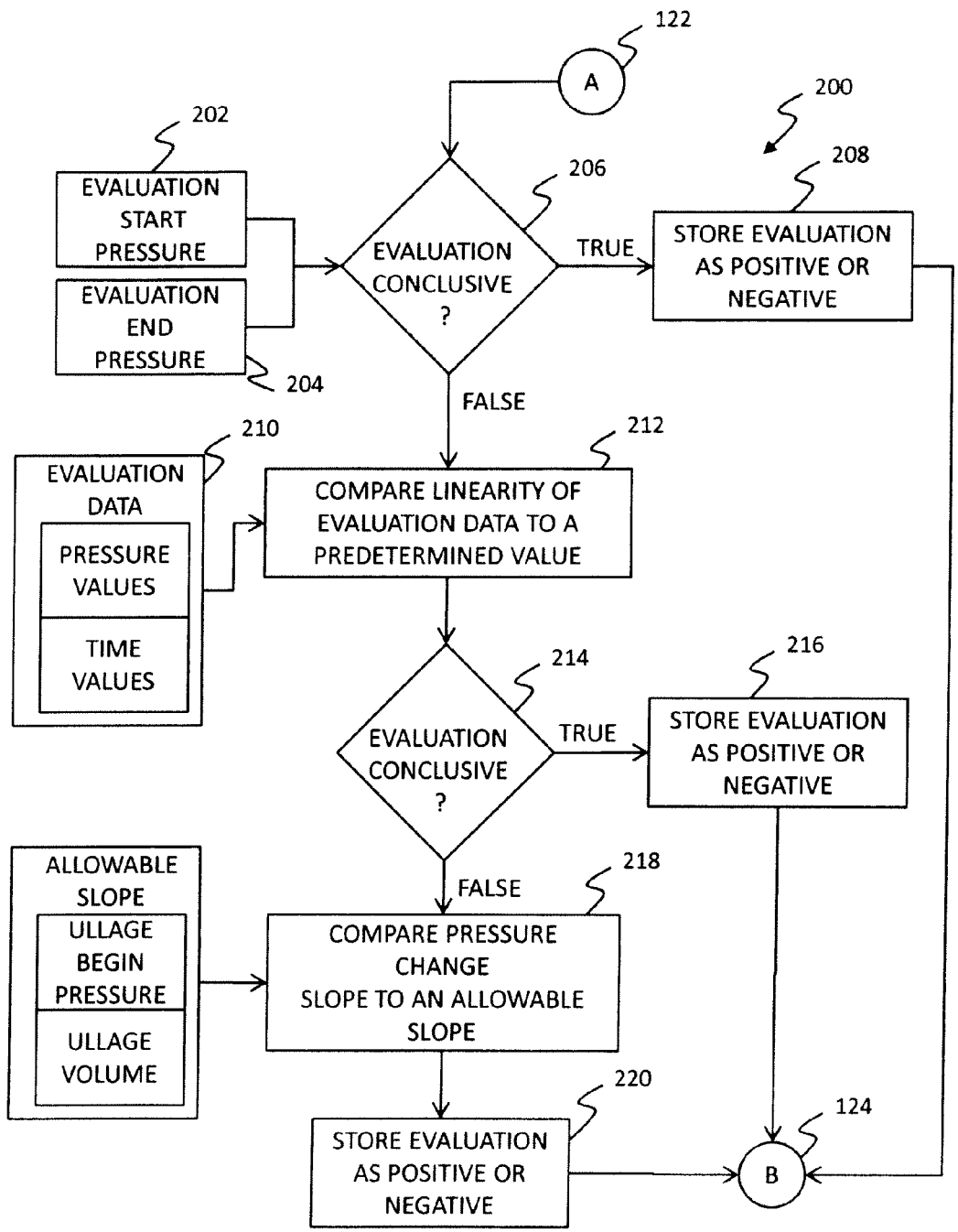

During the quiet time pressure evaluation, the controller 26 makes a pressure reading every minute. Once complete, the readings are electronically profiled and a status of the pressure evaluation is determined by controller 26 through the processing sequence 200 represented in FIG. 3. The profiles are described in Table 1, below. It has been found that there are 15 possible resulting situations:

For the remaining cases, the controller 26 performs a statistical $R^2$ analysis of the pressure data (represented by block 210) of the profiles, as represented by block 212. The $R^2$ analysis provides an indication of how close the samples fit a straight line. This value helps for certain cases where one wants to determine if the pressure is decaying at a constant even rate, or just fluctuating. In theory, if the containment area is leaking, then it would in most cases have a constant pressure decay rate. However this may also be true if the ullage pressure is expanding and generating pressure at a constant rate. These situations would result both in an $R^2$ approximately equal to 1.0.

On the other hand, if the containment area is tight and the fuel vapors are saturated, then the pressure curve will typically stay steady or switch from positive to negative and back to positive slopes. This would result in an $R^2$ significantly less than 1.0. In the present embodiment, the controller 26 considers an $R^2 > 0.90$ as indicative of a sufficiently straight line.

The formula for $R^2$ is:

$$R^2 = \left( \frac{\sum (x - \bar{x})(y - \bar{y})}{\sqrt{\sum (x - \bar{x})^2 \sum (y - \bar{y})^2}} \right)^2$$

where x and y represent the pressure value and corresponding time value for each of the pressure samples taken, and $\bar{x}$ and $\bar{y}$ represent the respective averages of all of the pressure samples and time values. The controller 26 calculates $R^2$ upon the completion of each test period.

For cases 1, 5, 11 and 13, wherein the $R^2$ value is not greater than 0.90, the test is determinative, as noted in Table 1, above (as represented by block 214). If the $R^2$ value is not greater

TABLE 1

| Case # | Start P | End P | Other | $R^2 > 0.90$ | Result |
|---|---|---|---|---|---|
| 1. | Negative | Negative | Start P (i.e., more negative than) < End P | No | Positive |
| 2. | Negative | Negative | Start P (i.e., more negative than) < End P | Yes | Inconclusive |
| 3. | Negative | Negative | Start P (i.e., less negative than) > End P | No or Yes | Positive |
| 4. | Negative | Zero | | Yes | Inconclusive |
| 5. | Negative | Zero | | No | Negative |
| 6. | Negative | Positive | | No or Yes | Positive |
| 7. | Zero | Negative | | No or Yes | Positive |
| 8. | Zero | Zero | | No or Yes | Negative |
| 9. | Zero | Positive | | No or Yes | Positive |
| 10. | Positive | Negative | | No or Yes | Positive |
| 11. | Positive | Zero | | No | Negative |
| 12. | Positive | Zero | | Yes | Inconclusive |
| 13. | Positive | Positive | Start P > End P | No | Positive |
| 14. | Positive | Positive | Start P > End P | Yes | Inconclusive |
| 15. | Positive | Positive | Start P < End P | Nor or Yes | Positive |

In certain ones of the situations (cases 3, 6-10 and 15), based simply on the starting pressure (as represented by block 202) and the ending pressure (as represented by block 204) the controller 26 can make a reasonable conclusion that the system for the quiet time pressure evaluation has either a positive result or a negative result (as represented in Table 1 and by block 206). If the starting pressure and the ending pressure are conclusive, the quiet time pressure evaluation is stored as either positive or negative, as represented by block 208. Otherwise controller 26 continues an evaluation of the pressure data.

than 0.90, the quiet time pressure evaluation is stored as either positive or negative, as represented by block 216. Otherwise controller 26 continues an evaluation of the pressure data.

For the remaining cases 2, 4, 12 and 14, wherein the $R^2$ value is greater than 0.90, the test is still inconclusive. For these cases, the controller 26 utilizes the ullage value and calculates a permissible pressure decay slope within which the actual decay slope must fall (as represented by block 218). As explained below, based on the pressure decay slope controller 26 may store the quiet time pressure evaluation as either positive or negative (as represented by block 220).

There is a known equation from which one can calculate an allowable final pressure to which the pressure can decay after a five minute test period. This equation is disclosed in the California Environmental Protection Agency Air Resources Board's (CARB) Vapor Test Procedure TP-201.3, amended Mar. 17, 1999. However use of this equation requires one to first pressurize the system to 2" water column (wc).

The CARB equation is:

$$P_p = P_s e^{(x/V)}$$

where $P_p$ is a permissible final pressure after the five minute test, $P_s$ is the number 2, for 2" water column (wc), the starting pressure on which the CARB data is based, e is the natural logarithm base, V is the ullage volume, in gallons and x is a variable depending upon the number of dispensing points. Table 2 below indicates the value for x stated in the above referenced CARB Test Procedure TP-201.3, for balance systems and vacuum-assist systems

TABLE 2

| Dispensing Points | Balance Systems | Vacuum-Assist Systems |
|---|---|---|
| 1-6 | −760.490 | −500.887 |
| 7-12 | −792.196 | −531.614 |
| 13-18 | −824.023 | −562.455 |
| 19-24 | −855.974 | −593.412 |
| >24 | −888.047 | −624.483 |

If after a five minute test period the final pressure $P_f$ is below a minimum value, as listed in Table 1B of the CARB Procedure, the system under test is deemed to have failed the test. One can also calculate the allowable slope b=(Δp/Δt) of the decay, where Δp is the change in pressure ($P_f$−2) and Δt is five minutes. Any pressure decay having a slope less than the allowable slope would be allowable.

The present embodiment utilizes the same equation to calculate an allowable final pressure over a five minute test period, then calculates the allowable slope, then determines the actual slope of the pressure decay over the entire test period and then determines whether the actual slope is less than (i.e., closer to zero) the allowable slope. However instead of pressurizing the UST 20 to 2" wc to begin the test, and using the number 2 in the equation, the controller 26 substitutes the actual starting pressure (provided the absolute value of the starting pressure is at least 0.5" wc).

To calculate the actual slope, the controller utilizes the following equation:

$$b = \frac{\sum (x - \bar{x})(y - \bar{y})}{\sum (x - \bar{x})^2}$$

As for the formula for $R^2$, above, x and y represent the pressure value and corresponding time value for each of the pressure samples taken, and $\bar{x}$ and $\bar{y}$ represent the respective averages of all of the pressure samples and time values. The controller 26 calculates the slope b upon the completion of each evaluation period.

For example:
Assume a starting pressure $P_s$=3.
Assume a quantity of 12 dispensing points, thus x=−531,614.
Assume an ullage=10000 gallons.
This results in an allowable final pressure $P_p$ of:

$$P_p = (3) * e^{(-531,614/10000)} = 2.84.$$

This results in an allowable slope of (2.84−3)/5=−0.032. If the calculated decay slope is less than (i.e., closer to zero) the allowable decay slope, the quiet time pressure evaluation is indicated as positive. If the calculated decay slope is greater than the allowable decay slope, the quiet time pressure evaluation is indicated as negative.

Failure to pass a particular quiet time pressure evaluation does not indicate a failure of the vapor recovery system. The controller continually performs quiet time pressure evaluations over the course of a given time period, such as a week, which are used as data points for determining whether the vapor recovery system has failed. Controller 26, in an exemplary test, determines if at least a threshold number of the quiet time pressure evaluations are negative for a given time period. If so, the vapor recovery system is determined to have failed. In one embodiment, the threshold value is 66% and the given time period is a week. In the event that the controller 26 determines that the vapor recovery system has failed, controller 26 generates an appropriate alarm. In one embodiment, an alarm is provided in the central location which includes controller 26, such as the station house. The alarm may be one or more of audio, visual, and tactile. In one embodiment, there is an audio alarm and a visible light. In one embodiment, the alarm condition may be communicated to proper entity over a network. Examples include an e-mail message, a fax message, a voice message, a text message, an instant message, or any other type of messaging communication. The controller 26 also shuts down all of the dispensing points 14 until the alarm is cleared.

Figure 4:
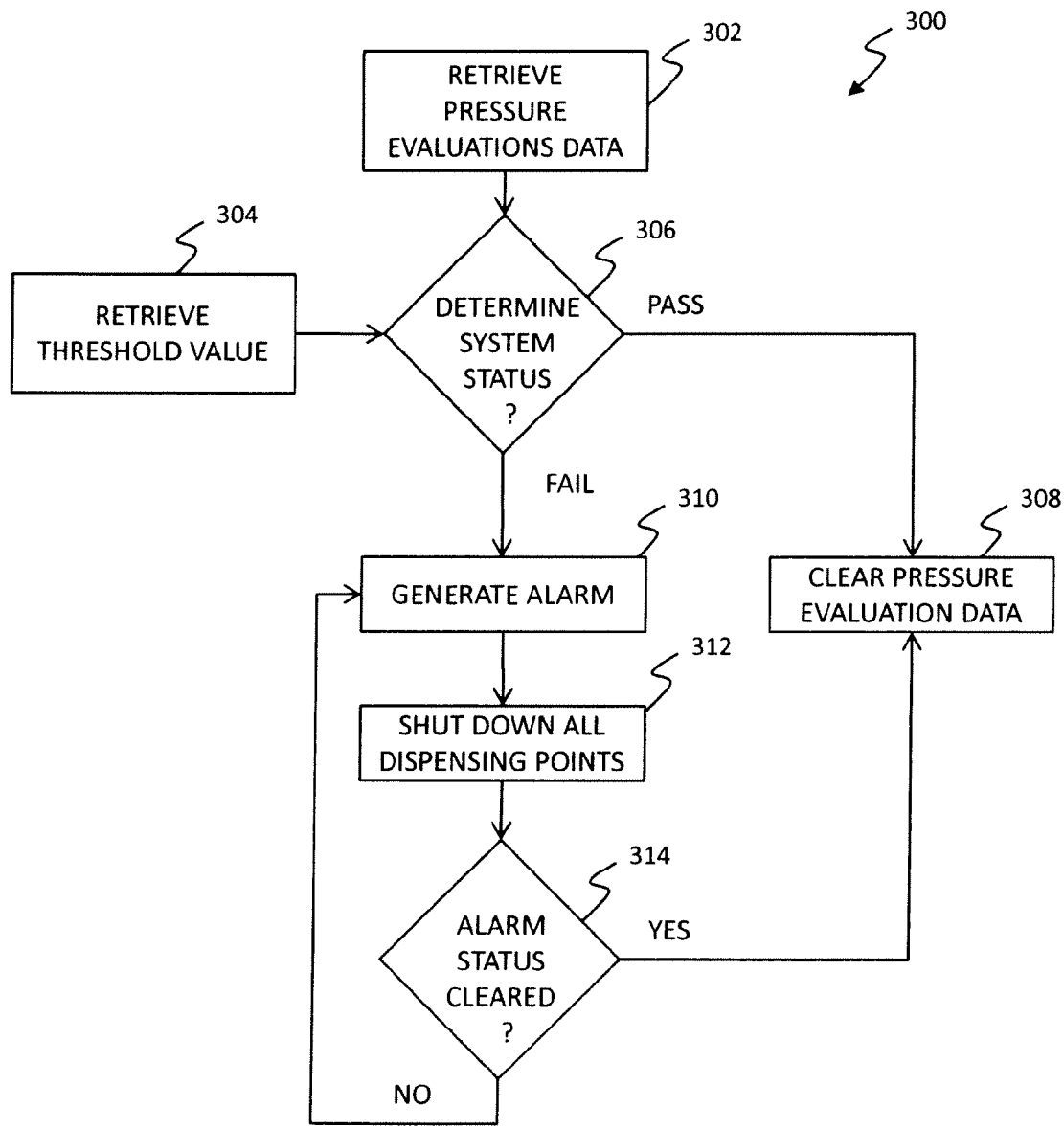

Referring to FIG. 4, a processing sequence 300 of controller 26 for a pressure test is shown. The quiet time pressure evaluation data is retrieved, as represented by block 302. A threshold value, such as 66%, is also retrieved as represented by block 304. Controller 26 determines the whether the vapor recovery system as passed or failed, as represented by block 306. In one embodiment, if a percentage of the number of negative pressure evaluations to the total number of evaluations exceeds the threshold amount, the vapor recovery system has failed. If the vapor recovery system passes, the pressure evaluation data is cleared, as represented by block 308. If the vapor recovery system fails, an alarm is generated as represented by block 310. Also, controller 26 shuts down all dispensing points 14, as represented by block 312, until the alarm status is cleared, as represented by block 314.

Discussed below is an analysis of each of the cases.

Case 1

In case 1, the pressure starts negative and ends less negative. The static pressure resulted in an $R^2$ that is less than 0.90. This indicates the pressure has saturated. Since the pressure remains in the negative region, it indicates that the system is not leaking, thereby resulting in a POSITIVE.

Case 2

Case 2 is similar to case 1 except the quiet time ended during the upward movement toward zero. Case 2 resulted in an inconclusive test based solely upon the $R^2$ value because the quiet time ended prematurely. One does not know if the slope would continue through the zero pressure region into the positive region or would flat line in the zero region. Therefore the controller will run the slope calculation, described above.

Case 3

Case 3 occurs when the ending negative pressure is more negative than the starting negative pressure. It is highly unlikely for a leaking tank to result in a more negative ending pressure from what it started at. There is thus no need for the controller to calculate the $R^2$ for this case because any value of $R^2$ would result in a POSITIVE.

Case 4

In case 4 the quiet time ended prematurely. Because the $R^2$ is greater than 0.90, it means the slope is fairly straight. However one does not know if the decay slope will continue through the zero region into the positive region. Therefore the pressure test is inconclusive based solely on the $R^2$ value, and the controller will execute the slope calculation described above.

Case 5

Case 5 is a classic case of a leaking vapor containment. The pressure begins in the negative region and results with a flat line in the zero region.

Case 6

Case 6 is a classic model for a tight vapor recovery containment. Here the pressure begins in the negative region and ends in the positive region without any regard for the zero region. A leaking tank will change its curve at the zero region rather than maintaining a high $R^2$.

Cases 7 and 9

In these two cases the starting pressure begins in the zero region and either expands to the positive region or contracts to the negative region. A leaking tank would remain at the zero point during a quiet period. Both of these two cases will result in a POSITIVE.

Case 8

This is the other classic case of a leaking vapor containment, especially a gross leak where the tank rarely moves out of the zero region during fueling activity. This case results in a NEGATIVE.

Case 10

This case is the same as case 6 but begins and ends in opposite regions.

Case 11

This case is the same as case 5 but the beginning pressure is in the positive region. This is a classic case when the system is pressurized and leaking.

Case 12

This case is the same as case 4 but the beginning pressure is in the positive region. Since one cannot assume the future path for the slope of the pressure one cannot make a decision if it is passing or failing. Therefore the controller must execute the slope calculation.

Case 13

This case is the same as case 1, but the beginning pressure is in the positive region and ending in the positive region. With the R2 being less than 0.90, it indicates the pressure is remaining in the positive region for a while. This case results in a POSITIVE.

Case 14

This case is the same as case 2 but the beginning pressure is in the positive region and ends in the positive region. The $R^2$ is greater than 0.90 which indicates the slope is still moving toward the zero region but ended prematurely. One cannot predict the future direction of the slope. Therefore the controller must execute the slope calculation.

Case 15

This case ends with a pressure that is greater than the starting pressure, which results with an automatic POSITIVE. There is no need to for the controller to calculate $R^2$.

The system and methods presented herein allow a vapor recovery system to be monitored for leaks during normal operation of the fueling facility. The system and methods monitor various aspects of a fuel dispensing system to determine a quiet time wherein there are no external changes to the vapor recovery system which would affect the pressure in the vapor recovery system. Exemplary external changes include the dispensing of fuel with one or more of the dispensing points, the delivery of fuel to the UST, and the active operation of a vapor processor. Further, the system and methods do not require a pressurization of the vapor recovery system to detect leaks of the vapor recovery system. The system and methods permit the continuous monitoring of the vapor recovery system for leaks.

From the foregoing, it will be observed that numerous variations and modifications may be affected without departing from the spirit and scope of the invention. It is to be understood that no limitation with respect to the specific apparatus illustrated herein is intended or should be inferred.

What is claimed is:

1. A system which monitors for leaks in a vapor recovery system of a fuel dispensing system including an underground storage tank and a plurality of dispensing points in fluid communication with the underground storage tank, the system comprising:

a controller which continuously monitors the vapor recovery system for leaks by monitoring the vapor recovery system for a quiet time period wherein there is the absence of external changes to vapor recovery system;

recording pressure data during the quiet time period; and determining whether the vapor recovery system contains a leak based on the recorded pressure data of a plurality of spaced apart independent quiet time periods, wherein the controller classifies each of the plurality of spaced apart independent quiet time periods as one of positive and negative and determines that the vapor recovery system contains the leak based on a measure of the number of quiet time periods classified as negative and the number of quiet time periods classified as positive.

2. The system of claim 1, wherein the controller determines that the vapor recovery system contains the leak when a percentage of negative quiet time periods exceeds a threshold value.

3. The system of claim 2, wherein the threshold value is 66 percent.

4. The system of claim 2, wherein the controller classifies a given quiet time period as positive based on a starting pressure of the quiet time period and an ending pressure of the quiet time period when the starting pressure and the ending pressure are both negative and the ending pressure is more negative than the starting pressure.

5. The system of claim 2, wherein the controller classifies a given quiet time period as positive based on a starting pressure of the quiet time period and an ending pressure of the quiet time period when the starting pressure is negative and the ending pressure is positive.

6. The system of claim 2, wherein the controller classifies a given quiet time period as positive based on a starting pressure of the quiet time period and an ending pressure of the quiet time period when the starting pressure is zero and the ending pressure is positive.

7. The system of claim 2, wherein the controller classifies a given quiet time period as positive based on a starting pressure of the quiet time period and an ending pressure of the quiet time period when the starting pressure is zero and the ending pressure is negative.

8. The system of claim 2, wherein the controller classifies a given quiet time period as negative based on a starting pressure of the quiet time period and an ending pressure of the quiet time period when the starting pressure is zero and the ending pressure is zero.

9. The system of claim 2, wherein the controller classifies a given quiet time period as positive based on a starting pressure of the quiet time period and an ending pressure of the quiet time period when the starting pressure is positive and the ending pressure is negative.

10. The system of claim 2, wherein the controller classifies a given quiet time period as positive based on a starting pressure of the quiet time period and an ending pressure of the quiet time period when the starting pressure and the ending pressure are both positive and the ending pressure is more positive than the starting pressure.

11. A system which monitors for leaks in a vapor recovery system of a fuel dispensing system including an underground storage tank and a plurality of dispensing points in fluid communication with the underground storage tank, the system comprising:
a controller which continuously monitors the vapor recovery system for leaks by
monitoring the vapor recovery system for a quiet time period wherein there is the absence of external changes to vapor recovery system;
recording pressure data during the quiet time period; and
based on the recorded pressure data determining whether the vapor recovery system contains a leak, wherein the determination of whether the vapor recovery system contains a leak is based on the recorded pressure data from a plurality of spaced apart quiet time periods, wherein the controller classifies each of the plurality of spaced apart quiet time periods as one of positive and negative and the controller determines that the vapor recovery system contains the leak when a percentage of negative quiet time periods exceeds a threshold value, and wherein the controller classifies a given quiet time period as one of positive and negative based on a degree of linearity of the recorded pressure data of the given quiet time period.

12. The system of claim 11, wherein the degree of linearity is an $R^2$ value, the given quiet time period is classified as one of positive and negative when the $R^2$ value is below a threshold amount.

13. The system of claim 12, wherein the threshold amount is 0.90.

14. The system of 12, wherein the controller classifies a given quiet time period as positive based on the recorded pressure data when a starting pressure of the quiet time period and an ending pressure of the quiet time period are both negative, the ending pressure is less negative than the starting pressure, and the $R^2$ value of the pressure data is below the threshold amount.

15. The system of claim 12, wherein the controller classifies a given quiet time period as negative based on the recorded pressure data when a starting pressure of the quiet time period is negative, an ending pressure of the quiet time period is zero, and the $R^2$ value of the pressure data is below the threshold amount.

16. The system of claim 12, wherein the controller classifies a given quiet time period as negative based on the recorded pressure data when a starting pressure of the quiet time period is positive, an ending pressure of the quiet time period is zero, and the $R^2$ value of the pressure data is below the threshold amount.

17. The system of claim 12, wherein the controller classifies a given quiet time period as positive based on the recorded pressure data when a starting pressure of the quiet time period and an ending pressure of the quiet time period are both positive, the ending pressure is less positive than the starting pressure, and the $R^2$ value of the pressure data is below the threshold amount.

18. The system of claim 2, wherein the controller classifies a given quiet time period as one of positive and negative based on a pressure decay slope of an ullage of the vapor recovery system without pressurization of the vapor recovery system.

19. The system of claim 18, wherein based on a number of dispensing points, a starting pressure of the ullage, and a volume of the ullage a threshold slope is determined.

20. The system of claim 19, wherein when the pressure decay slope is less than the threshold slope the given quiet time period is classified as positive.

21. A system which monitors for leaks in a vapor recovery system of a fuel dispensing system including an underground storage tank and a plurality of dispensing points in fluid communication with the underground storage tank, the system comprising:
a controller which continuously monitors the vapor recovery system for leaks by
monitoring the vapor recovery system for a quiet time period wherein there is the absence of external changes to vapor recovery system;
recording pressure data during the quiet time period; and
based on the recorded pressure data determining whether the vapor recovery system contains a leak, wherein the determination of whether the vapor recovery system contains a leak is based on the recorded pressure data from a plurality of spaced apart quiet time periods and wherein the controller first attempts to classify a given quiet time period as one of positive and negative based on the starting pressure and the ending pressure, if inconclusive then further on a degree of linearity of the pressure data, and, if still inconclusive, then further on a pressure decay slope of an ullage of the vapor recovery system, without the need to pressurize the vapor recovery system or to limit fuel dispensing from the fuel dispensing system.

22. The system of claim 1, monitoring the vapor recovery system for a quiet time period includes monitoring whether any dispensing points are active and monitoring whether fuel is being delivered to the underground storage tank, wherein if either a dispensing point is active or fuel is being delivered to the underground storage tank a quiet time period does not exist.

23. The system of claim 1, monitoring the vapor recovery system for a quiet time period includes monitoring whether any dispensing points are active, whether a vapor processor of the vapor recovery system is active, and monitoring whether fuel is being delivered to the underground storage tank, wherein if either a dispensing point is active, the vapor processor is active, or fuel is being delivered to the underground storage tank a quiet time period does not exist.

24. The system of claim 1, wherein a given quiet time period is at least twelve minutes.

25. The system of claim 24, wherein the given quiet time period is up to sixty minutes.

26. A method for monitoring a vapor recovery system of a fuel dispensing system including an underground storage tank and a plurality of dispensing points in fluid communication with the underground storage tank for a leak, the method comprising the steps of:
continuously monitoring the vapor recovery system for a quiet time period wherein there is the absence of external changes to vapor recovery system;
recording pressure data during the quiet time period; and
determining whether the vapor recovery system contains a leak based on the recorded pressure data of a plurality of spaced apart independent quiet time periods which are classified as one of positive and negative, wherein the determination of whether the vapor recovery system contains the leak is based on a measure of the number of quiet time periods classified as negative and the number of quiet time periods classified as positive.

27. A system which monitors for leaks in a vapor recovery system of a fuel dispensing system including an underground storage tank and a plurality of dispensing points in fluid communication with the underground storage tank, the system comprising:
   a controller which monitors the vapor recovery system for leaks by
   monitoring the vapor recovery system for a quiet time period wherein there is the absence of external changes to vapor recovery system;
   recording pressure data during the quiet time period; and
   determining whether the vapor recovery system contains a leak without pressurizing the vapor recovery system based on the recorded pressure data of a plurality of spaced apart independent quiet time periods, wherein the controller classifies each of the plurality of spaced apart independent quiet time periods as one of positive and negative and determines that the vapor recovery system contains the leak based on a measure of the number of quiet time periods classified as negative and the number of quiet time periods classified as positive.

28. A method for monitoring a vapor recovery system of a fuel dispensing system including an underground storage tank and a plurality of dispensing points in fluid communication with the underground storage tank for a leak, the method comprising the steps of:
   monitoring the vapor recovery system for a quiet time period wherein there is the absence of external changes to vapor recovery system;
   recording pressure data during the quiet time period; and
   determining whether the vapor recovery system contains a leak without pressurizing the vapor recovery system based on the recorded pressure data of a plurality of spaced apart independent quiet time periods which are classified as one of positive and negative, wherein the determination of whether the vapor recovery system contains the leak is based on a measure of the number of quiet time periods classified as negative and the number of quiet time periods classified as positive.

29. A system which monitors for leaks in a vapor recovery system of a fuel dispensing system including an underground storage tank and a plurality of dispensing points in fluid communication with the underground storage tank, the system comprising:
   a controller which continuously monitors the vapor recovery system for leaks by
   monitoring the vapor recovery system for a quiet time period wherein there is the absence of external changes to vapor recovery system;
   recording pressure data during the quiet time period; and
   determining whether the vapor recovery system contains a leak based on the recorded pressure data of a plurality of spaced apart independent quiet time periods which are classified in one of a plurality of classifications, wherein the determination of whether the vapor recovery system contains the leak is based on a measure of the quiet time periods classified in a first classification.

30. A method for monitoring a vapor recovery system of a fuel dispensing system including an underground storage tank and a plurality of dispensing points in fluid communication with the underground storage tank for a leak, the method comprising the steps of:
   continuously monitoring the vapor recovery system for a quiet time period wherein there is the absence of external changes to vapor recovery system;
   recording pressure data during the quiet time period; and
   determining whether the vapor recovery system contains a leak based on the recorded pressure data of a plurality of spaced apart independent quiet time periods which are classified in one of a plurality of classifications, wherein the determination of whether the vapor recovery system contains the leak is based on a measure of the quiet time periods classified in a first classification.

31. A system which monitors for leaks in a vapor recovery system of a fuel dispensing system including an underground storage tank and a plurality of dispensing points in fluid communication with the underground storage tank, the system comprising:
   a controller which monitors the vapor recovery system for leaks by
   monitoring the vapor recovery system for a quiet time period wherein there is the absence of external changes to vapor recovery system;
   recording pressure data during the quiet time period; and
   determining whether the vapor recovery system contains a leak without pressurizing the vapor recovery system based on the recorded pressure data of a plurality of spaced apart independent quiet time periods which are classified in one of a plurality of classifications, wherein the determination of whether the vapor recovery system contains the leak is based on a measure of the quiet time periods classified in a first classification.

32. A method for monitoring a vapor recovery system of a fuel dispensing system including an underground storage tank and a plurality of dispensing points in fluid communication with the underground storage tank for a leak, the method comprising the steps of:
   monitoring the vapor recovery system for a quiet time period wherein there is the absence of external changes to vapor recovery system;
   recording pressure data during the quiet time period; and
   determining whether the vapor recovery system contains a leak without pressurizing the vapor recovery system based on the recorded pressure data of a plurality of spaced apart independent quiet time periods which are classified in one of a plurality of classifications, wherein the determination of whether the vapor recovery system contains the leak is based on a measure of the quiet time periods classified in a first classification.

33. The system of claim 27, wherein the controller determines that the vapor recovery system contains the leak when a percentage of negative quiet time periods exceeds a threshold value.

34. The system of claim 33, wherein the threshold value is 66percent.

35. The system of claim 33, wherein the controller classifies a given quiet time period as positive based on a starting pressure of the quiet time period and an ending pressure of the quiet time period when the starting pressure and the ending pressure are both negative and the ending pressure is more negative than the starting pressure.

36. The system of claim 33, wherein the controller classifies a given quiet time period as positive based on a starting pressure of the quiet time period and an ending pressure of the quiet time period when the starting pressure is negative and the ending pressure is positive.

37. The system of claim 33, wherein the controller classifies a given quiet time period as positive based on a starting pressure of the quiet time period and an ending pressure of the quiet time period when the starting pressure is zero and the ending pressure is positive.

38. The system of claim 33, wherein the controller classifies a given quiet time period as positive based on a starting pressure of the quiet time period and an ending pressure of the quiet time period when the starting pressure is zero and the ending pressure is negative.

39. The system of claim 33, wherein the controller classifies a given quiet time period as negative based on a starting pressure of the quiet time period and an ending pressure of the quiet time period when the starting pressure is zero and the ending pressure is zero.

40. The system of claim 33, wherein the controller classifies a given quiet time period as positive based on a starting pressure of the quiet time period and an ending pressure of the quiet time period when the starting pressure is positive and the ending pressure is negative.

41. The system of claim 33, wherein the controller classifies a given quiet time period as positive based on a starting pressure of the quiet time period and an ending pressure of the quiet time period when the starting pressure and the ending pressure are both positive and the ending pressure is more positive than the starting pressure.

42. The system of claim 27, monitoring the vapor recovery system for a quiet time period includes monitoring whether any dispensing points are active and monitoring whether fuel is being delivered to the underground storage tank, wherein if either a dispensing point is active or fuel is being delivered to the underground storage tank a quiet time period does not exist.

43. The system of claim 27, monitoring the vapor recovery system for a quiet time period includes monitoring whether any dispensing points are active, whether a vapor processor of the vapor recovery system is active, and monitoring whether fuel is being delivered to the underground storage tank, wherein if either a dispensing point is active, the vapor processor is active, or fuel is being delivered to the underground storage tank a quiet time period does not exist.

44. The system of claim 27, wherein a given quiet time period is at least twelve minutes.

45. The system of claim 44, wherein the given quiet time period is up to sixty minutes.

* * * * *

UNITED STATES PATENT AND TRADEMARK OFFICE
CERTIFICATE OF CORRECTION

PATENT NO.         : 8,402,817 B2
APPLICATION NO.    : 12/473595
DATED              : March 26, 2013
INVENTOR(S)        : Joseph A. Mellone and Randall S. Boucher It is certified that error appears in the above-identified patent and that said Letters Patent is hereby corrected as shown below:

In the Claims:

Claim 14, Column 13, Line 40, before "12" insert --claim--

Claim 15, Column 13, Line 47, before "12" insert --claim--

Claim 16, Column 13, Line 53, before "12" insert --claim--

Claim 17, Column 13, Line 59, before "12" insert --claim--

Claim 22, Column 14, Line 34, after "1" insert --wherein--

Claim 23, Column 14, Line 41, after "1" insert --wherein--

Claim 34, Column 16, Line 51, delete "66percent" and insert --66 percent--

Claim 42, Column 18, Line 1, after "27" insert --wherein--

Claim 43, Column 18, Line 8, after "27" insert --wherein--

Signed and Sealed this
Sixteenth Day of July, 2013

Teresa Stanek Rea
*Acting Director of the United States Patent and Trademark Office*